United States Patent [19]

Whittaker

[11] Patent Number: 4,625,707
[45] Date of Patent: Dec. 2, 1986

[54] CORE DRILL APPARATUS

[75] Inventor: Robert H. Whittaker, Derry Township, Westmoreland County, Pa.

[73] Assignee: Westinghouse Electric Corp., Pittsburgh, Pa.

[21] Appl. No.: 790,697

[22] Filed: Oct. 23, 1985

[51] Int. Cl.⁴ .............................................. B28D 1/02
[52] U.S. Cl. ...................................... 125/20; 408/57; 409/136; 51/267
[58] Field of Search ............... 408/27, 57, 59; 125/20; 409/136; 51/267

[56] References Cited

U.S. PATENT DOCUMENTS

| | | | |
|---|---|---|---|
| 2,084,686 | 6/1937 | Howard | 125/20 |
| 3,229,427 | 1/1966 | Goodhew | 408/57 |
| 3,561,299 | 2/1971 | Brisk | 408/59 |
| 4,208,229 | 6/1980 | Giardini | 125/20 |
| 4,541,758 | 9/1985 | Frank | 125/20 |

FOREIGN PATENT DOCUMENTS

| | | | |
|---|---|---|---|
| 276271 | 8/1927 | United Kingdom | 125/20 |
| 157590 | 5/1962 | U.S.S.R. | 408/57 |

Primary Examiner—Harold D. Whitehead
Attorney, Agent, or Firm—Dean Schron

[57] ABSTRACT

Drilling apparatus for trepanning a difficult to work material. A drill member includes a very thin wall cylindrical cutting head integral with a shank portion, with the assembly being machined from the same piece of stock to insure concentricity. A fluid supply collar includes lower and upper Teflon washer inserts which surround the shank portions and which are held in place respectively by a shoulder of the cutting head and a chuck or other holder of a machine which rotates the drill member. Fluid supplied to the collar is directed through radial and axial passageways in the drill member to the lower margin thereof, and which lower margin includes a continuous abrading surface on the inside, outside and edge thereof. The length of shank extending from the holder is extremely short due to the dimension of the collar thereby resulting in high stiffness to insure for concentricity during drilling operations. A power down feed arrangement is provided so that the drill member is advanced into the workpiece at a predetermined constant rate.

10 Claims, 11 Drawing Figures

CORE DRILL APPARATUS

BACKGROUND OF THE INVENTION

1. Field of the Invention

The invention in general relates to a rotary tool for drilling, and particularly for trepanning procedures.

2. Description of the Prior Art

Trepanning operations involve the removal of a disk or cylindrical core from a workpiece. A diversity of drill arrangements exists for this purpose and generally include a cylindrical cutter portion having some sort of abrading material at the lower margin thereof, together with a coolant fluid for flushing away drilled material from the workpiece.

For many applications the existing drills are entirely satisfactory. For ultraprecision drilling operations however, a need exists for a drill apparatus which can initiate a cut into a relatively hard material without progressively chipping the surface thereof and without causing a tapered hole.

To achieve this precision drilling, the drilling procedure requires the application of a protective plate overlay to the workpiece in order to stabilize the drill cutting operation and to absorb chipping so as to protect the surface finish of the workpiece. After the cutting operation and after the disk or cylindrical core has been removed, an ultrafine diamond coated tool is utilized to provide an ultrasmooth finish on the wall surface of the hole or removed piece of material.

One type of workpiece which occasionally requires a trepanning operation is a piezoceramic transducer having a surface coated with a thin silver layer acting as an electrode. Silver is relatively soft and under high speed operation of the core drill results in a plugging up of the drill's cutting surface in a manner that prevents further free cutting, as buildup of the plug is thicker than the abrading material depth. To prevent this, conventional practice requires the removal of the silver electrode prior to cutting, and the subsequent deposition of the electrode after cutting.

The core drilling apparatus of the present invention eliminates the requirement for an overlay application when drilling hard materials and, when drilling into soft materials does not plug up, thereby eliminating the need for removing relatively soft surfaces such as in electrode transducer workpieces.

SUMMARY OF THE INVENTION

The apparatus includes a drill member which has a cylindrical cutting head portion as well as a shank portion which is inserted into a holder of a machine which rotates the drill member. The cylindrical cutter head portion and the shank portion are both machined from the same single piece of stock so as to form a one piece unitary body lying along a longitudinal axis.

The cutter head portion includes a very thin wall portion having a smooth continuous lower margin and defining a hollow interior and onto which margin is deposited an abrasive cutting material. The cutter head portion may be of equal, smaller or wider diameter than the shank but in any event the stock is machined so as to define a shoulder in the transition region between the two. The shank includes a generally axial fluid passageway near the shoulder and an axial fluid passageway which extends from the radial fluid passageway to the hollow interior of the cutter portion.

A relatively short collar member fits over and surrounds the shank portion and includes lower and upper sealing washers having central apertures which fit tightly around the shank so as to form a relatively fluid tight seal with the arrangement defining an internal cavity surrounding the shank. The washers are simply press fit into respective lower and upper portions of the collar member and are respectively held in place by the shoulder portion and the holder of the machine. A filtered flushing fluid is supplied to the internal cavity of the collar member and travels through the axial and radial passageways to the hollow interior and around the abrasive cutting material to flush away the very fine particles of the workpiece.

The machine for rotating the drill member in a preferred embodiment includes a down feed arrangement which is power operated as opposed to a hand operated down feed which is not uniformly administered and will cause plugging of the abrasive portion of cutter.

DESCRIPTION OF THE PREFERRED EMBODIMENT

Figure 1A:
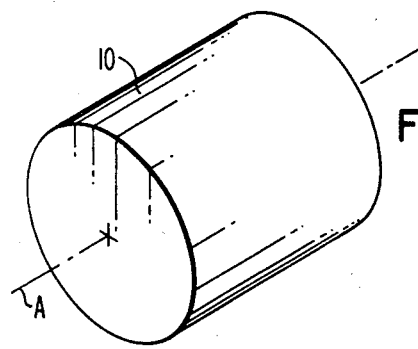
FIGS. 1A to 1F illustrate various machining steps in the manufacture of the core drill.

As opposed to multi-piece drill units, it is imperative that the drill member of the present invention be fabricated from a single piece of stock such as mild steel bar. FIG. 1A illustrates the stock 10 in cylindrical form and having a central axis A.

Figure 1B:
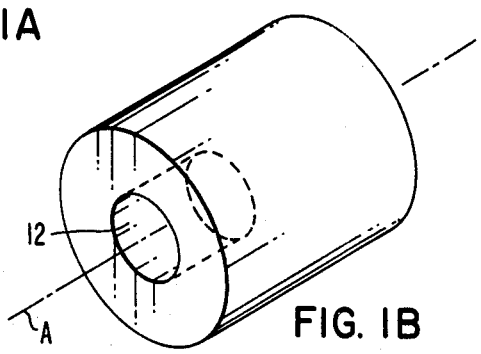
Figure 1C:
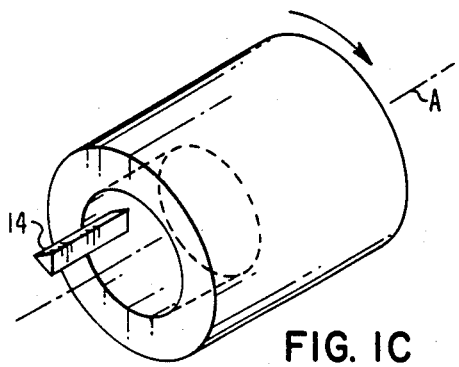
Figure 1D:
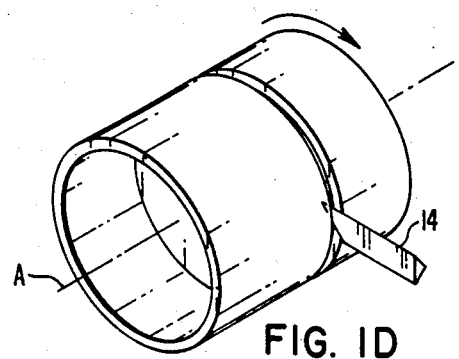
Figure 1E:
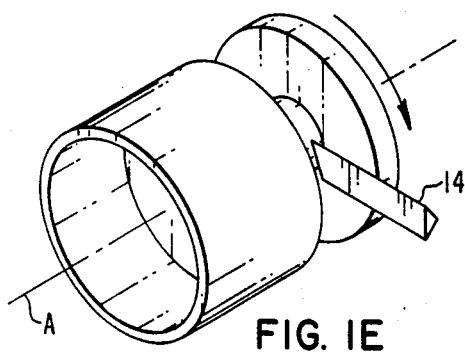

In order to reduce the machining operation, one end of the bar may be initially drilled as designated by numeral 12 in FIG. 1B and with the opposite end of the bar secured in a chuck of a lathe (not shown) and rotated in the direction of the arrow in FIG. 1C, a cutting tool 14 may progressively remove stock material from the interior cavity until a very thin wall remains. Thereafter, and as illustrated in FIG. 1D, the cutting tool 14 is positioned to remove stock material to form a shank portion as in FIG. 1E and the end of which may be removed from the stock being held by the lathe chuck.

Figure 1F:
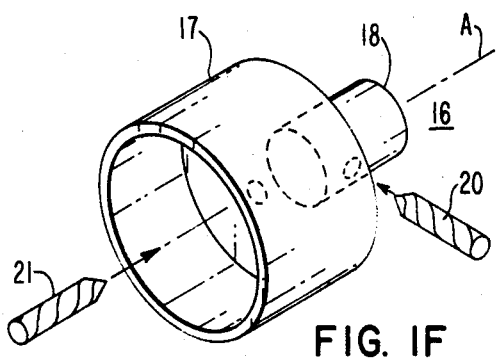

As illustrated in FIG. 1F, the drill member 16 thus formed includes a cylindrical cutting head portion 17 and a shank portion 18 integral therewith since both have been machined from the same single piece of stock, with both portions having the same longitudinal axis A. In the example illustrated, the shank diameter is less than the cutter head diameter. A drill bit 20 is utilized to place a fluid passageway in the shank portion 18, preferably in a radial direction while drill bit 21 is operable to provide an axial fluid passageway which meets the radial fluid passageway. A completed drill member 16 is illustrated in FIG. 2 where it is seen that the cylindrical cutting head portion 17 has an extremely thin side wall 24, the arrangement defining a hollow interior 26.

As opposed to many drill bits having slots placed in the cutter edge, the lower margin 28 of sidewall 24 is continuous so as to provide for better stability. Around this lower margin 28 there is deposited an abrasive material 30 such as small particles of diamond, or boron nitride, which is primarily used on steel.

Figure 2:
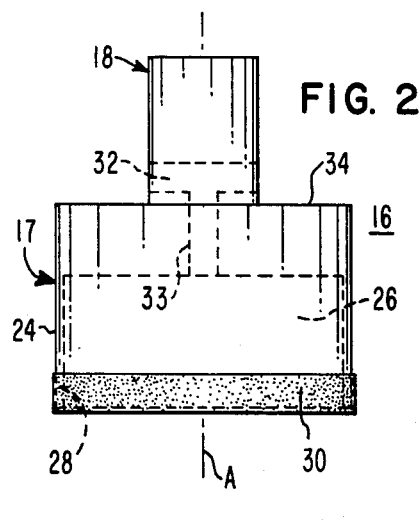
FIG. 2 is an elevational view of the core drill ready for use.
Figure 3:
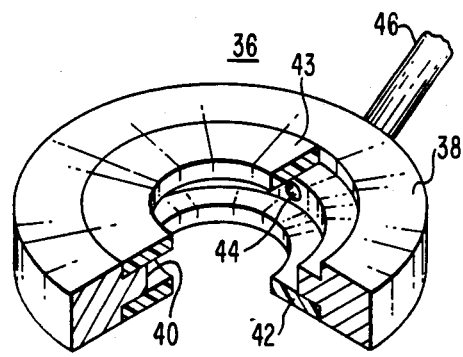
FIG. 3 is a view, with a portion broken away, showing the collar member for introducing a fluid into the core drill interior.

Radial fluid passageway 32 preferably extends all the way through shank portion 18 and FIG. 2 illustrates the axial fluid passageway 33 extending from passageway 32 down to the hollow interior 26 of the cutting head portion 17. The machined drill member defines a shoulder 34 in the transition region between the cutting head portion 17 and the shank portion 18 so as to form a bearing surface for a fluid supplying collar member as illustrated in FIG. 3, to which reference is now made.

Fluid supply collar 36 may be made up of an apertured disk 38 such as of stainless steel and which has been counterbored on the lower and upper surfaces so as to define a central ledge 40. Lower and upper sealing washers 42 and 43 such as of Teflon, are press fit into the counterbores so that they rest against the central ledge 40. A fluid passageway 44 is drilled in the side of the disk 38 and is in communication with a fluid supply pipe 46. Sealing washers 42 and 43 have an internal diameter very slightly smaller than that of the shank portion of the drill member so as to form a generally fluid tight seal therewith.

Figure 4:
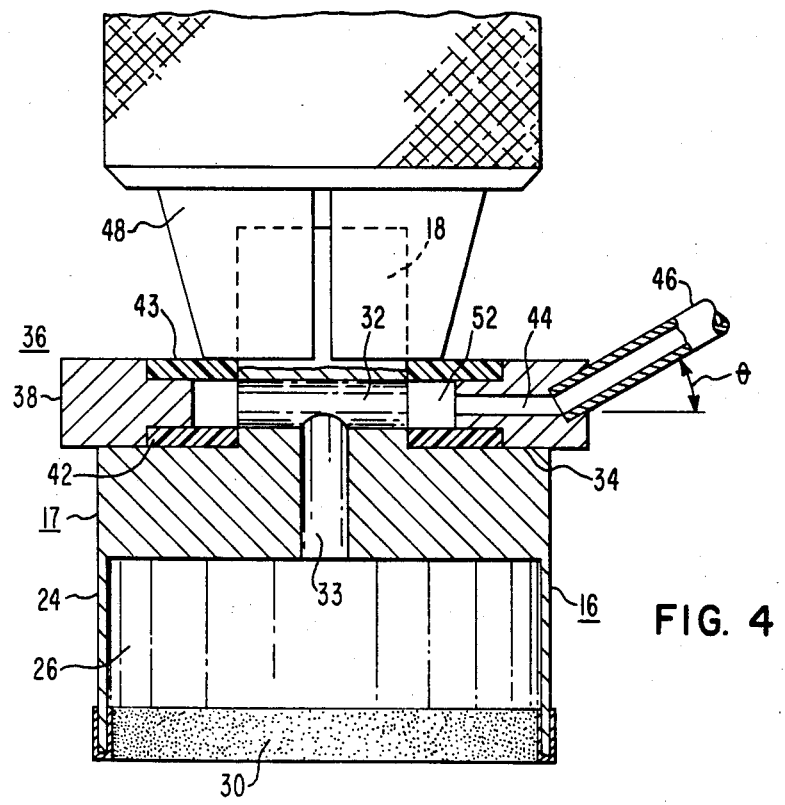
FIG. 4 illustrates, in cross sectional view, the drilling apparatus in relation to a holder of a machine for rotating the drill.

In one embodiment, as illustrated in FIG. 4, the fluid supply collar 36 rests directly on shoulder 34 of the drill member 16 and is held in place by a chuck, or other holder 48 of the machine which rotates the drill member. Chuck 48 bears directly on upper washer 43 with the arrangement constraining any vertical movement of the collar 36.

As seen in FIG. 4 fluid supply pipe 46 is secured to the disk 38 at a slight angle $\theta$, for example 10°, relative to the horizontal so as to afford room for any necessary pipe couplings. Filtered fluid supplied in pipe 46 traverses passageway 44 and enters an internal cavity 52 of the collar, and from which cavity fluid is provided to the cutting edge of the drill member via passageways 32 and 33 and hollow interior 26, for flushing away particles of the workpiece as the drilling member is progressively advanced.

It is seen therefore that the arrangement provides for an ultra-short unit. The shank portion 18 extending out of the chuck 48 is of a vertical dimension corresponding to the thickness of fluid supply collar 36, which in itself, due to its simplicity of construction, is relatively thin. It is well known in mechanics that the stiffness of a rod varies inversely as the cube of its length. By providing an arrangement with an ultra-short shank length, and with the shank portion concentric with, and an integral part of, the cutter head portion, a drill member is provided which is extremely stable and exhibits nothing other than concentric rotation thereby distributing the cutting load uniformly on the abrasive edge to not only allow for finer and smoother cuts but prolong the life of the abrasive surface. This operation is opposed to multipiece drill bits or those with longer shanks which, relative to precision work, have a tendency to rotate eccentrically and utilize only a portion of the abrasive surface, which is that portion rotating with the largest radius for an O.D. cutter, thereby resulting in chipped workpieces and scored surfaces requiring further smoothing operations.

Figure 5:
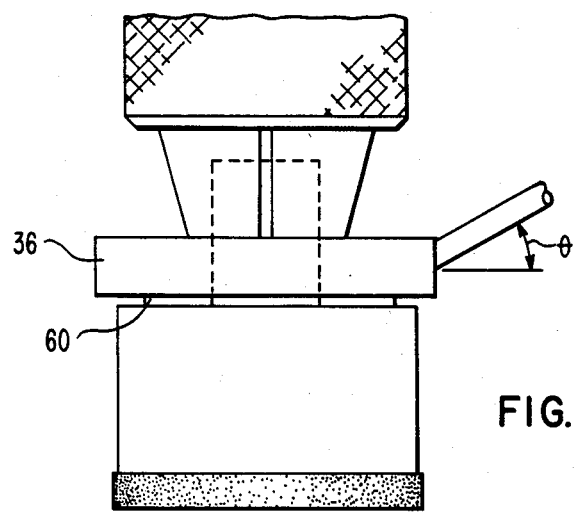
FIG. 5 illustrates the same as FIG. 4 with a slight modification.

FIG. 5 is the same as FIG. 4 with the addition of a separator or spacer member 60 which serves to keep the underside of disk 38 from constantly rubbing the outside edge of shoulder 34 as the drill member is rotated during operation. Depending upon the dimensions of the drill member, the separator 60 may prevent gauling at the outer edge of the shoulder where the circumferential speed is highest and which in time may cause chatter. Although illustrated as a separate piece which slips over the shank portion separator 60 may be made an integral part of the drill member itself.

Figure 6:
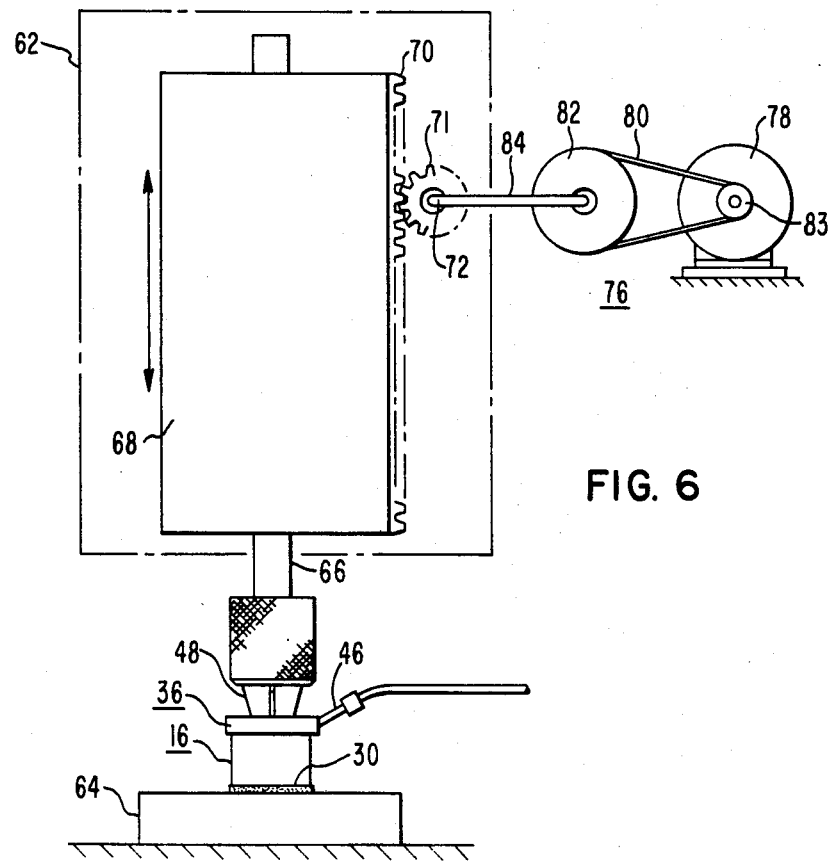
FIG. 6 is a representation of the machine for rotating the drill member.

For precision drilling attainable with the apparatus of the present invention it is preferable that a precision machine for rotating the drill member be utilized. One type of machine which meets this objective is a vertical milling machine denoted by the general numeral 62 in FIG. 6. A workpiece 64 is illustrates as being trepanned by the drill member 16 which in turn is connected via chuck 48 to a shaft 66 rotated by a motor (not illustrated) of the milling machine 62.

Shaft 66 is supported by bearings in a quill member 68 movable in the direction of the arrow to advance the drill member into the workpiece and thereafter remove it. Movement of quill member 68 is accomplished, by way of example, by a worm or, bevel gear or as illustrated, by means of a rack and pinion assembly 70, 71 wherein for normal use a shaft 72 of pinion 71 is coupled to a handle or a wheel for manual rotation and accordingly manual advancement of the drill member. In order to achieve the ultraprecise drilling operation with the present invention, the drill member must be advanced into the workpiece at a predetermined unvarying constant rate, an objective unattainable by a manual movement. Accordingly, a powered down feed arrangement 76 is provided which includes a motor 78 which will rotate constantly at any one of a number of predetermined speeds. A belt 80 is disposed around pulley 82 as well as a smaller diameter pulley 83 attached to the shaft of motor 78. A shaft 84 couples pulley 82 with the shaft of pinion 81 to thereby insure for the predetermined constant speed down feed of quill 68, and accordingly of drill member 16.

For a given rotation of shaft 66 the speed of the down feed may be chosen in accordance with the material of the workpiece being drilled. By way of example for a shaft rotational speed of approximately 3000 to 4000 rpm and for drilling through a relatively soft silver electrode of a transducer, the down feed may be in the order of 0.040" to 0.110" per minute. The narrow dimension of the thin wall of the cylindrical cutting head reduces the amount of silver that must be cut and flushed radially outward from the lower edge thereby reducing the possibility of soft ductile silver particles from becoming attached to the leading edge of the cutter. In addition, the arrangement insures that ultrafine particles of silver are produced during the cutting operation so that they may be flushed away between the particles of the abrasive material.

After the silver electrode layer has been traversed, down feed may be increased to, for example, 0.200" per minute depending upon the material being cut, abrasive particle size, speed of rotation of cutter and surface finish desired, by way of example.

The apparatus is equally adaptable to cutting through ultra-hard materials such as metal matrix compounds which may include some proportion of silicon carbide and aluminum. For such materials, the down feed at the 3000 to 4000 rpm shaft speed may be in the order of 0.100" per minute for a 1" O.D. cutter. With the disclosed apparatus and power down feed rate, not only are ultraprecision holes made in various different types of materials, but the drill life is prolonged by placing minimal stress on the diamond cutting edge and there is no tendency to rotate off axis, particularly on deep holes since the cutting pressure is much less than required to force a drill to scrap or melt its way through the same material. As an added advantage, the reduced pressure on the material being cut produces minimal noise so that hearing protection for an operator is not required.

I claim:

1. Apparatus for drilling cores in a workpiece comprising:
   (A) a drill member having a cylindrical cutter head portion and a shank portion adapted to be inserted into a holder of a machine for rotating the drill member;
   (B) said hollow cylindrical cutter head portion and said shank portion both being machined from the same single piece of stock so as to form a one-piece unitary body lying along a longitudinal axis;
   (C) said cylindrical cutter head portion including a relatively thin wall portion having a smooth, continuous lower margin and defining a hollow interior;
   (D) an abrasive cutting material deposited on said lower margin of said relatively thin wall portion;
   (E) means defining a shoulder portion in the transition region between said cylindrical cutter head portion and said shank portion;
   (F) said shank portion having at least a radial fluid passageway and an axial fluid passageway extending from said radial fluid passageway to the hollow interior of said cylindrical cutter portion;
   (G) a short collar member in the form of a relatively thin disk having a central axial aperture adapted to fit over and surround said shank portion and including lower and upper sealing washers having central apertures substantially equal to the dimension of said shank portion so as to form a substantially fluid-tight seal therewith, the arrangement defining an internal cavity surrounding said shank portion;
   (H) said disk being counterbored on the bottom and top surfaces thereof to thereby define a central internal ledge;
   (I) said lower and upper sealing washers being press-fit into respective lower and upper portions of said collar member abutting opposite sides at said internal ledge and being held in place by said shoulder portion and said holder of said machine; and
   (J) means for supplying a fluid to said internal cavity of said collar member.

2. Apparatus according to claim 1 wherein:
   (A) said shank portion includes a diametrical fluid passageway.

3. Apparatus according to claim 1 wherein:
   (A) said abrasive cutting material is deposited uninterruptedly on the inside, outside and edge of said lower margin.

4. Apparatus according to claim 1 wherein:
   (A) said disk includes a fluid passageway extending from the sidewall of said disk through said internal ledge.

5. Apparatus according to claim 4 which includes:
   (A) a fluid delivery pipe coupled to said disk at said fluid passageway and disposed at an $\theta$ with respect to horizontal, where $\theta > 0°$.

6. Apparatus according to claim 5 wherein: (A) $\theta$ is approximately 10°.

7. Apparatus according to claim 1 which includes:
   (A) a spacer member disposed between said shoulder potion and the bottom of said collar member.

8. Apparatus according to claim 1 wherein:
   (A) said machine includes an axially moveable member having a drive mechanism and coupled to said holder to advance said drill member into said workpiece;
   (B) a drive motor;
   (C) means coupling said drive motor to said drive mechanism to axially move said axially moveable member at a predetermined constant rate.

9. Apparatus according to claim 8 wherein:
   (A) said drive mechanism includes a drive gear;
   (B) said coupling means includes a first pulley connected to the shaft of said drive motor, a second pulley connected to said drive gear and a continuous belt interconnecting said pulleys.

10. Apparatus according to claim 1 wherein:
    (A) said shank portion is of smaller diameter than said cylindrical cutter head portion.

* * * * *